Nov. 22, 1932.  E. W. McCARROLL  1,888,325
VANITY BENCH
Filed March 13, 1931
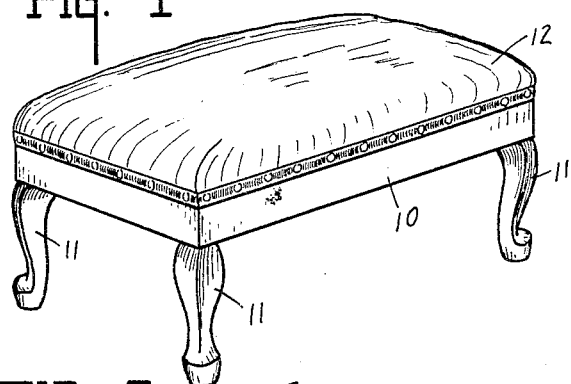
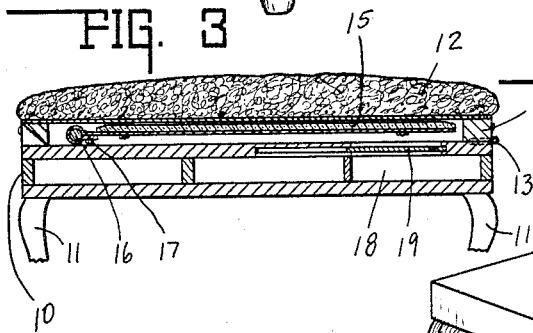
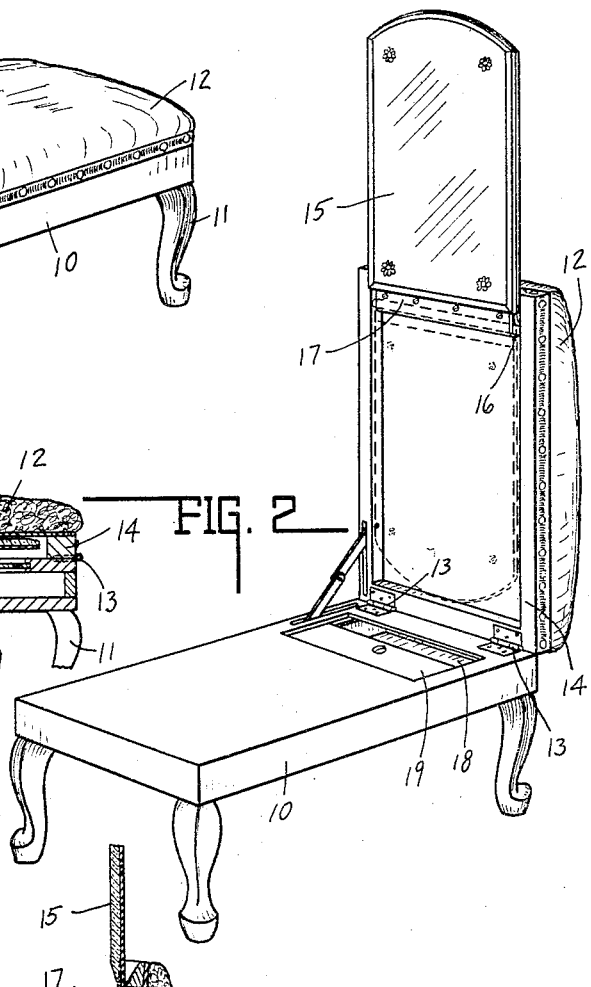
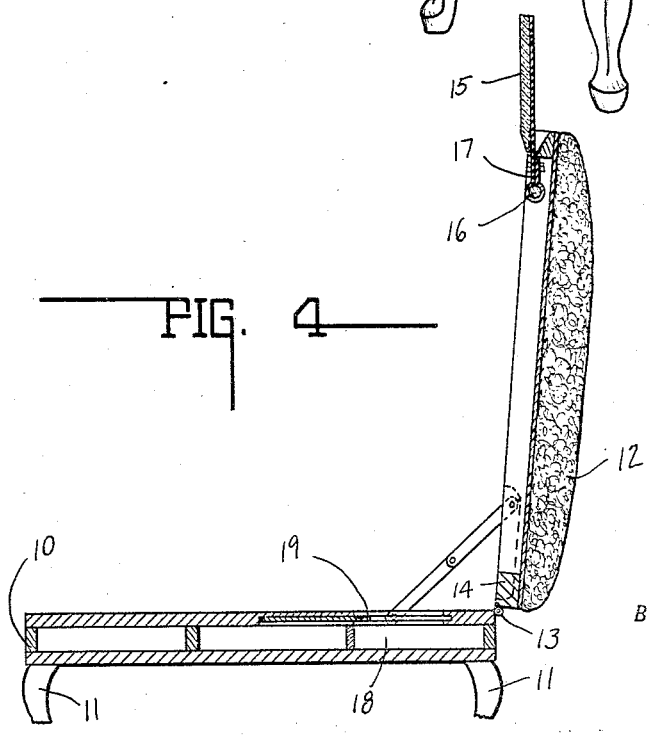
INVENTOR.
EDWARD W. McCARROLL.
BY Lockwood Lockwood
Goldsmith & Galt
ATTORNEYS.

Patented Nov. 22, 1932

1,888,325

UNITED STATES PATENT OFFICE

EDWARD W. McCARROLL, OF CHICAGO, ILLINOIS

VANITY BENCH

Application filed March 13, 1931. Serial No. 522,289.

This invention relates to a vanity bench having embodied therein a mirror and compartment adapted to be raised to open position for use in perfecting the toilet, substantially as shown in my copending applications, Serial No. 506,019, filed January 2, 1931 and Serial No. 512,784, filed February 2, 1931.

The object of this invention is to provide a bench with a hinged cushion adapted to be swung to upright position for carrying a mirror pivotally mounted upon and housed by the cushion, said mirror being swung to extended position for use in perfecting one's toilet when seated upon the cushion support of the bench.

The principal feature of the invention resides in housing the mirror within the cushion and pivotally mounting it thereon, said cushion acting as a support for the mirror when in operative position.

Another feature of the invention resides in the provision of a compartment for containing toilet articles carried by the bench beneath the hinged cushion so as to be accessible and useable when the cushion is in its open mirror supporting position.

The full nature of the invention will be understood from the accompanying drawing and the following description and claims:

Fig. 1 is a perspective view of the bench with the cushion in normal closed position. Fig. 2 is the same as Fig. 1 showing the cushion in open position with the mirror extending therefrom. Fig. 3 is a central vertical section through the bench when the cushion and mirror are in closed position. Fig. 4 is the same as Fig. 3 showing the cushion in open position with the mirror extended therefrom.

In the drawing there is shown a bench having a supporting bed or frame 10 mounted upon the legs 11. The cushion 12 is hinged to the support at one end thereof by the hinges 13.

The cushion comprises the hinged frame 14 upon which the upholstery of the cushion is mounted. Said cushion is adapted to be lowered to closed position so as to provide the usual cushion seat for the user, as illustrated in Figs. 1 and 3, or as swung to an upright open position as shown in Figs. 2 and 4.

The frame 14 of the cushion provides a housing for the mirror 15, said mirror being hingedly mounted within the frame of the cushion at the opposite end thereof from the hinges 13. The mirror is hingedly supported by the hinge rod 16 extending across the upper end of the cushion frame when in upright position, and upon which the mirror is frictionally held in adjusted position by the clamping hinge member 17. Thus, the mirror can be swung from the housed position shown in dotted lines in Fig. 2 to the upright position shown in full lines.

In this position, one may straddle and be seated upon the supporting bed 10 while utilizing the mirror 15 for any desired purpose, the bench being movable to the proper position to obtain the best lighting effect.

Mounted in the bed or frame 10, there is a compartment indicated by the numeral 18 having an aperture in the top of the frame which may be opened or closed by the sliding panel or door 19. Said compartment provides a convenient container for toilet articles or the like.

The invention claimed is:

1. A vanity bench including a supporting bed, a seat hingedly mounted thereon adapted to be swung from closed to upright position, and a mirror pivotally mounted upon said seat adapted to be concealed thereby when in closed position and extend upwardly therefrom to be supported thereby when in upright position.

2. A vanity bench including a supporting bed, a seat comprising a frame hingedly mounted at one end of said bed and having upholstery secured over the top thereof, a mirror normally mounted within said seat frame for concealment therein when said seat is in closed position resting upon said bed, and means for hingedly mounting said mirror within said frame so as to permit it to be swung to upwardly extending position in substantial alignment with said seat and supported thereby so as to face the bench for reflecting the image of the user when seated thereon.

3. A vanity bench including a supporting bed, a seat comprising a frame hingedly mounted at one end of said bed and having upholstery secured over the top thereof, a mirror normally mounted within said seat frame at the opposite end thereof from the hinge connection with the supporting bed, means for maintaining said mirror in upright extended adjusted position upon said seat so as to face the user thereof when seated upon the exposed supporting bed.

In witness whereof, I have hereunto affixed my signature.

EDWARD W. McCARROLL.